US011690353B2

(12) United States Patent
Hayashi et al.

(10) Patent No.: US 11,690,353 B2
(45) Date of Patent: Jul. 4, 2023

(54) APPARATUS AND METHOD FOR TRANSPORTING AN ANIMAL

(71) Applicant: Barkbox, Inc., New York, NY (US)

(72) Inventors: Natsuki Hayashi, New York, NY (US); Daniel Grossman, Brooklyn, NY (US); Melissa Seligmann Gokhvat, New York, NY (US)

(73) Assignee: BARKBOX, INC., New York, NY (US)

( * ) Notice: Subject to any disclaimer, the term of this patent is extended or adjusted under 35 U.S.C. 154(b) by 147 days.

(21) Appl. No.: 16/363,286

(22) Filed: Mar. 25, 2019

(65) Prior Publication Data

US 2019/0289813 A1    Sep. 26, 2019

Related U.S. Application Data

(60) Provisional application No. 62/647,937, filed on Mar. 26, 2018.

(51) Int. Cl.
*A01K 1/02* (2006.01)
*A01K 1/035* (2006.01)

(52) U.S. Cl.
CPC ............ *A01K 1/0254* (2013.01); *A01K 1/029* (2013.01); *A01K 1/0353* (2013.01)

(58) Field of Classification Search
CPC .... A01K 1/029; A01K 1/0157; A01K 1/0236; A01K 1/0245; A01K 1/054; A01K 1/0353; A01M 31/006
USPC ......................................................... 119/497
See application file for complete search history.

(56) References Cited

U.S. PATENT DOCUMENTS

| 2,969,767 | A | * | 1/1961  | Bassett         | A01K 1/0254 119/497 |
| 3,547,079 | A | * | 12/1970 | Bassett         | A01K 1/0254 119/497 |
| 3,818,962 | A | * | 6/1974  | Muller-Scherak  | A45C 9/00 383/3 |
| 3,850,144 | A | * | 11/1974 | Springer        | A01K 1/0254 119/497 |
| 3,976,113 | A | * | 8/1976  | Kim             | A45C 9/00 383/4 |
| 4,337,812 | A | * | 7/1982  | Trinkner        | A45C 9/00 206/541 |
| 4,375,111 | A | * | 3/1983  | Hall            | A47G 9/062 190/2 |
| 4,468,810 | A | * | 8/1984  | Longo           | A45F 4/06 190/1 |
| 4,538,709 | A | * | 9/1985  | Williams        | A45C 3/004 190/18 A |
| 4,723,300 | A | * | 2/1988  | Aranow          | A45C 7/00 383/4 |
| 4,811,768 | A | * | 3/1989  | Williams        | A45F 3/02 150/108 |
| 4,856,912 | A | * | 8/1989  | Damus           | A45C 3/10 383/4 |

(Continued)

*Primary Examiner* — Ebony E Evans
(74) *Attorney, Agent, or Firm* — Grogan, Tuccillo & Vanderleeden, LLP

(57) ABSTRACT

An apparatus for transporting an animal is provided. The apparatus includes a body having a plurality of panels that are operative to transition between a closed position and an open position. In the closed position, the panels define a cavity that is configured to contain an animal. In the open position, the panels define a bed mat.

6 Claims, 5 Drawing Sheets

(56) References Cited

U.S. PATENT DOCUMENTS

| | | | | |
|---|---|---|---|---|
| 4,977,857 A * | 12/1990 | Slawinski | A01K 1/0254 | 119/497 |
| 5,110,219 A * | 5/1992 | Lopes | A45C 9/00 | 5/419 |
| 5,170,745 A * | 12/1992 | Burdette, Jr. | A01K 1/0254 | 119/497 |
| 5,176,102 A * | 1/1993 | Tracy | A01K 1/0254 | 119/497 |
| 5,193,486 A * | 3/1993 | Kitchens | A01K 1/0263 | 119/712 |
| 5,370,460 A * | 12/1994 | Nelson | A45F 4/02 | 383/4 |
| 5,482,374 A * | 1/1996 | Buhyoff | A45B 23/00 | 383/4 |
| D370,090 S * | 5/1996 | Coggins | D3/214 | |
| 5,603,573 A * | 2/1997 | Mercier | A01K 1/0236 | 119/497 |
| 5,693,398 A * | 12/1997 | Granger | A45C 3/10 | 383/4 |
| 5,931,120 A * | 8/1999 | Burns | A01K 1/0254 | 119/497 |
| 6,076,485 A * | 6/2000 | Peeples | A01K 1/0254 | 119/496 |
| 6,286,461 B1 * | 9/2001 | Martz | A01K 1/0254 | 119/497 |
| 6,431,334 B1 * | 8/2002 | Lin | A45C 5/14 | 190/115 |
| 7,207,426 B2 * | 4/2007 | Godshaw | A45C 3/004 | 190/1 |
| 7,597,209 B2 * | 10/2009 | Rothschild | A45C 7/0036 | 220/23.87 |
| 7,617,917 B2 * | 11/2009 | Hai | A01K 1/0254 | 119/487 |
| 7,665,421 B2 * | 2/2010 | Martz | A01K 1/0254 | 119/497 |
| 8,171,888 B2 * | 5/2012 | Chou | A01K 1/0254 | 119/497 |
| 8,261,698 B1 * | 9/2012 | McClain | A01K 1/0254 | 119/501 |
| 8,820,596 B1 * | 9/2014 | Bergquist | A45F 4/02 | 224/575 |
| 9,095,234 B2 * | 8/2015 | Lee | B65D 33/00 | |
| 9,681,641 B2 * | 6/2017 | Lau | A01K 1/0254 | |
| 9,781,901 B2 * | 10/2017 | Rivera | A01K 1/029 | |
| 10,000,158 B2 * | 6/2018 | Darrow | B60N 3/10 | |
| 10,182,633 B1 * | 1/2019 | Giovanni | A45C 13/002 | |
| 10,617,096 B2 * | 4/2020 | Watson | A01K 1/0254 | |
| 10,716,374 B1 * | 7/2020 | Salibi | A45C 13/103 | |
| 2002/0074372 A1 * | 6/2002 | Pickett | A01K 1/0254 | 224/637 |
| 2002/0124808 A1 * | 9/2002 | Zampelli | A45F 3/00 | 119/497 |
| 2003/0015559 A1 * | 1/2003 | Oh | A45F 3/04 | 224/153 |
| 2003/0127060 A1 * | 7/2003 | Yeung | A01K 1/0254 | 119/497 |
| 2004/0129234 A1 * | 7/2004 | Beretich, Sr. | A01K 1/0245 | 119/497 |
| 2005/0238261 A1 * | 10/2005 | Godshaw | A01K 1/0254 | 383/40 |
| 2006/0032456 A1 * | 2/2006 | Kwon | A01K 1/0254 | 119/497 |
| 2006/0049227 A1 * | 3/2006 | Godshaw | A45F 3/04 | 224/637 |
| 2006/0096550 A1 * | 5/2006 | Holtzworth | A01K 1/029 | 119/850 |
| 2006/0278173 A1 * | 12/2006 | Kamijo | B60R 7/043 | 119/496 |
| 2007/0022969 A1 * | 2/2007 | Godshaw | A01K 1/0254 | 119/497 |
| 2007/0215425 A1 * | 9/2007 | Slater | A45C 7/0077 | 190/115 |
| 2007/0221136 A1 * | 9/2007 | Buttner | A45C 3/08 | 119/497 |
| 2008/0149673 A1 * | 6/2008 | Slater | A45F 3/04 | 224/153 |
| 2008/0156275 A1 * | 7/2008 | Lam | A01K 1/0254 | 119/497 |
| 2008/0184941 A1 * | 8/2008 | Hai | A01K 1/0254 | 119/497 |
| 2008/0185082 A1 * | 8/2008 | Mejia | A45C 3/08 | 150/105 |
| 2009/0205578 A1 * | 8/2009 | Alves | A01K 1/0107 | 119/454 |
| 2009/0314219 A1 * | 12/2009 | Bryson | A01K 1/0254 | 119/496 |
| 2010/0089335 A1 * | 4/2010 | DelaBarre | A01K 1/0254 | 119/497 |
| 2010/0126427 A1 * | 5/2010 | McGrade | A01K 1/0254 | 119/496 |
| 2010/0175633 A1 * | 7/2010 | Krauss | A01K 1/0254 | 119/497 |
| 2010/0313824 A1 * | 12/2010 | Northrop | A01K 1/0254 | 119/496 |
| 2011/0005467 A1 * | 1/2011 | Siklosi | A01K 1/0254 | 119/497 |
| 2011/0017145 A1 * | 1/2011 | Northrop | A01K 1/0254 | 119/497 |
| 2011/0056441 A1 * | 3/2011 | Chang | A01K 1/0245 | 119/453 |
| 2011/0127309 A1 * | 6/2011 | Chua | A01K 1/029 | 224/600 |
| 2011/0197822 A1 * | 8/2011 | Chou | A01K 1/0254 | 119/496 |
| 2012/0186533 A1 * | 7/2012 | Lu | A01K 1/0254 | 119/497 |
| 2014/0116348 A1 * | 5/2014 | Kwok | A01K 1/0254 | 119/497 |
| 2014/0185963 A1 * | 7/2014 | Lown | A45C 13/02 | 493/210 |
| 2014/0196668 A1 * | 7/2014 | Bindi | A01K 1/0254 | 119/497 |
| 2014/0230748 A1 * | 8/2014 | Renforth | A01K 1/0254 | 119/496 |
| 2015/0122196 A1 * | 5/2015 | Liu | A01K 1/0254 | 119/497 |
| 2016/0192613 A1 * | 7/2016 | Fickes | A01K 1/029 | 119/497 |
| 2016/0227730 A1 * | 8/2016 | Rivera | A45F 3/04 | |
| 2017/0020101 A1 * | 1/2017 | Parker | A45F 3/02 | |
| 2017/0071148 A1 * | 3/2017 | Lau | A01K 1/0254 | |
| 2017/0265430 A1 * | 9/2017 | Renforth | A01K 1/0236 | |
| 2017/0325420 A1 * | 11/2017 | Torres | A45C 13/001 | |
| 2018/0000175 A1 * | 1/2018 | Rojas | A41D 3/00 | |
| 2018/0359990 A1 * | 12/2018 | Graham | A01K 1/029 | |

* cited by examiner

APPARATUS AND METHOD FOR TRANSPORTING AN ANIMAL

CROSS-REFERENCE TO RELATED APPLICATION

This application claims the benefit of U.S. Provisional Application No. 62/647,937 filed on Mar. 26, 2018, the recitations of which are incorporated by reference herein in their entirety.

BACKGROUND

Technical Field

Embodiments of the invention relate generally to bags, and more specifically, to an apparatus and method for transporting an animal.

Discussion of Art

As will be appreciated, many people enjoy the companionship of small animals, i.e., "pets." Many pet owners transport their pets, e.g., toy breed dogs or other suitably sized pets, to various venues in bags/purses. Many traditional bags/purses, however, are ill-suited for transporting pets. For example, the interiors of many traditional bags/purses are often made of expensive and/or delicate fabrics, e.g., silk, felt, etc., which tend to rip and/or tear when contacted by a pet's claws and/or teeth, and which may also absorb bodily fluids from a pet. Further, the edges of the openings of many traditional bags/purses are often thin and/or sharp, which, in turn, may irritate the neckline of a pet hanging its head over the sidewalls of the bag/purse. Moreover, the sidewalls of many bags/purses are often taller than the head of a pet when standing and/or sitting within the small bag/purse, thus causing many pets to stand-up and/or extend their neck, which, in turn, may make the pet uncomfortable and/or experience strain injuries. As used herein with respect to animals, the term "standing" refers to the normal/relaxed standing posture of an animal, e.g., on four legs for a dog or a cat, and the term "standing-up" refers to an abnormal/unrelaxed standing posture of an animal, e.g., on two hind-legs for a dog or a cat.

Additionally, many small bags/purses are not suitable for use as floor mats and/or bedding. Thus, many pet owners, wishing to provide a comfortable place for their pet to sit and/or sleep after having been transported via a traditional small bag/purse, must usually carry an extra blanket and/or mat.

Conversely, many devices, referred to herein as "traditional pet-carriers", which are specifically configured to transport animals, are often ill-suited for use as a small bag/purse. For example, many traditional pet-carriers have small door-like openings that typically make placing a large number of objects within such a traditional pet-carrier, or removing the objects therefrom, difficult and/or time consuming. Moreover, while some traditional pet-carriers include bedding within their containment chambers, such traditional pet-carriers are typically bulky and/or take up a large volume of space.

What is needed, therefore, is an improved apparatus and method for transporting an animal.

BRIEF DESCRIPTION

In an embodiment, an apparatus for transporting an animal is provided. The apparatus includes a body having a plurality of panels that are operative to transition between a closed position and an open position. In the closed position, the panels define a cavity that is configured to contain an animal. In the open position, the panels define a bed mat.

DRAWINGS

The present invention will be better understood from reading the following description of non-limiting embodiments, with reference to the attached drawings, wherein below:

DETAILED DESCRIPTION

Figure 1:
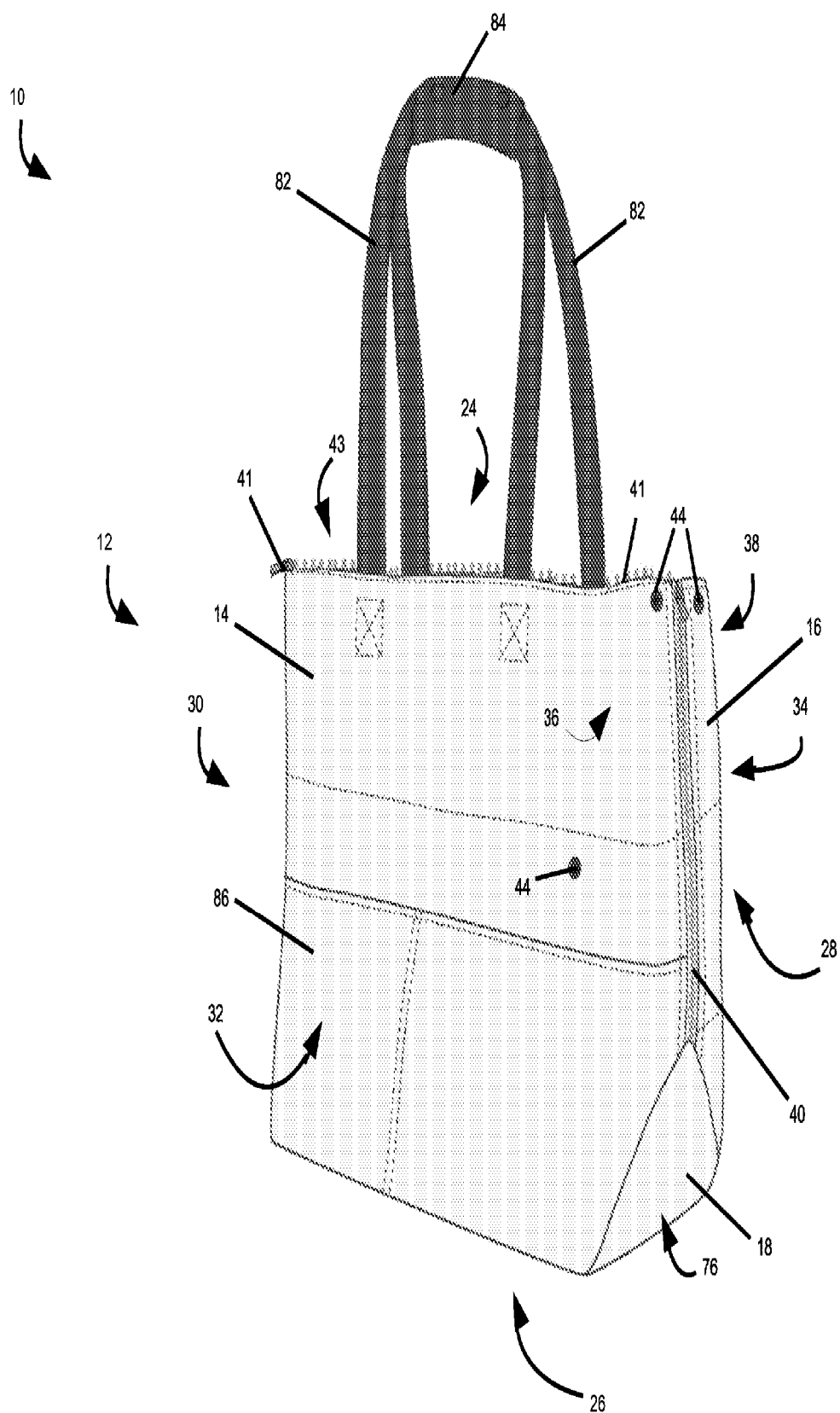
FIG. 1 is a diagram of an apparatus for transporting an animal, wherein a body of the apparatus is in a closed position, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly.

Additionally, while the embodiments disclosed herein are described with respect to transportation containers/carriers for animals, it is to be understood that embodiments of the present invention are equally applicable to other types of containers which may, or may not, be suitable for transporting animals.

Figure 3:
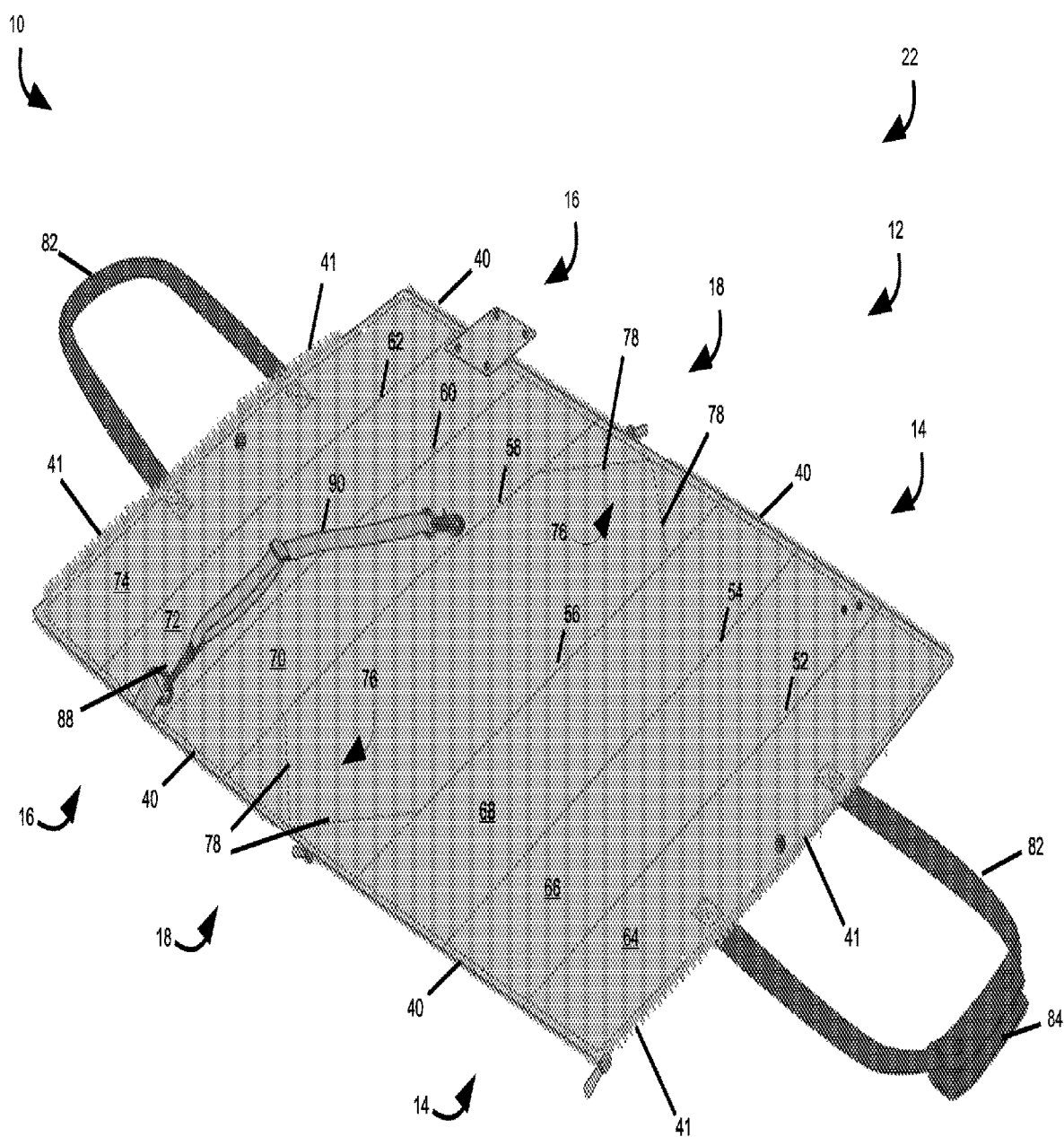
FIG. 3 is a diagram depicting a perspective view of the apparatus of FIG. 1, wherein the body is in an open position so as to define a bed mat.
Figure 4:
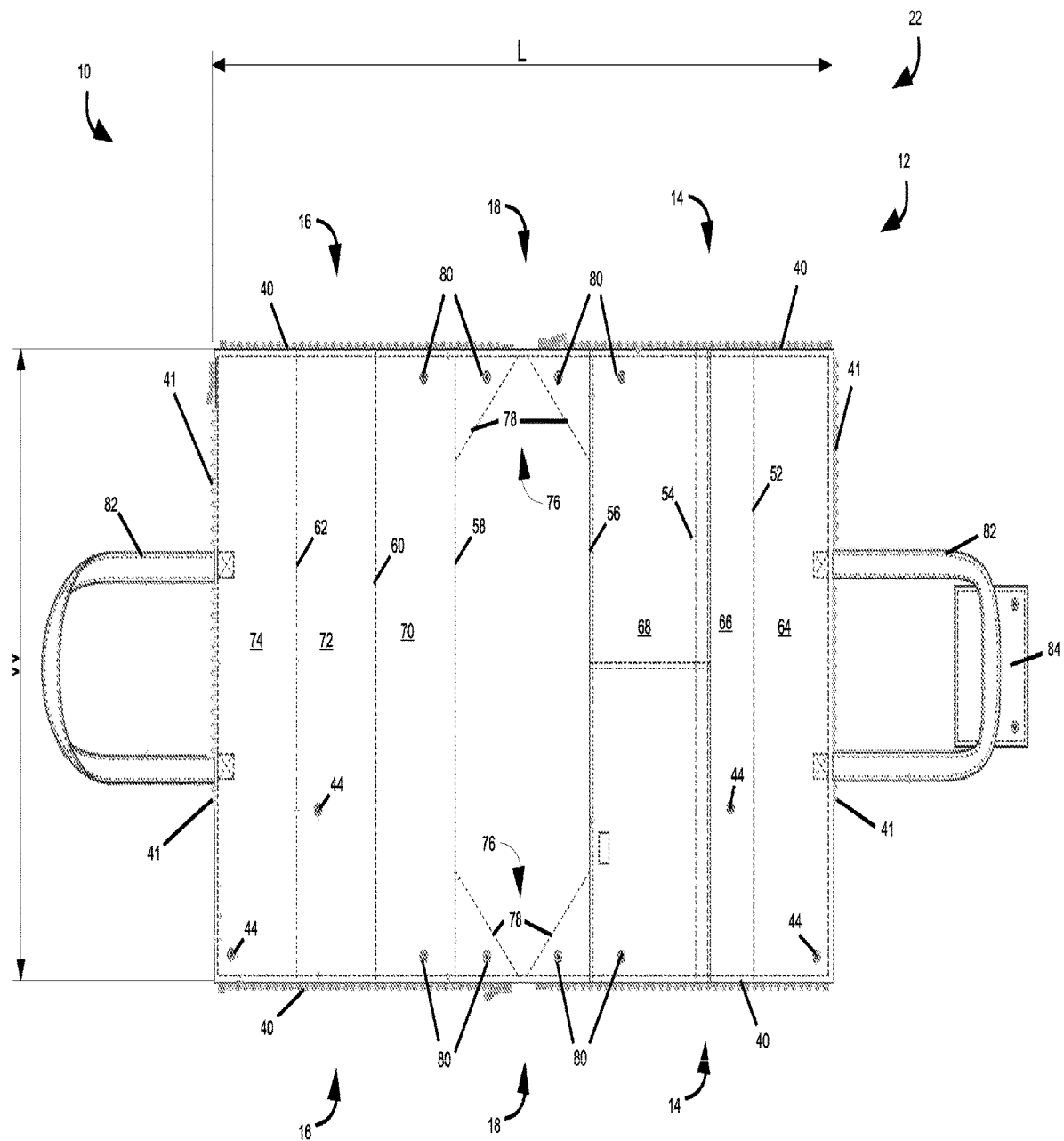
FIG. 4 is a diagram depicting a top-down view of the body of FIG. 3 in the open position, in accordance with an embodiment of the present invention.
Figure 5:
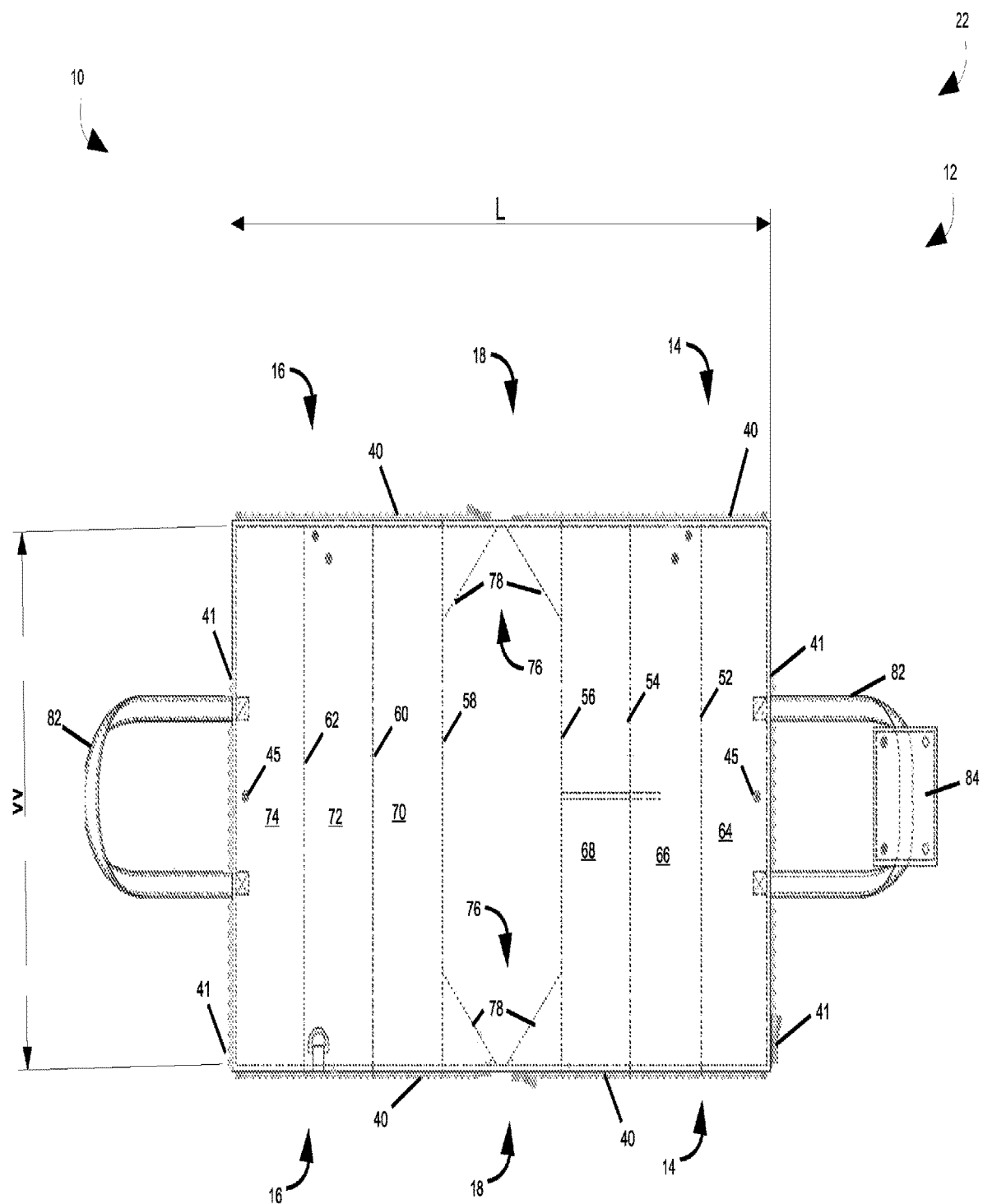
FIG. 5 is a diagram depicting a bottom-down view of the body of FIG. 3 in the open position, in accordance with an embodiment of the present invention.

Referring now to FIG. 1, an apparatus 10 for transporting an animal is shown. The apparatus 10 includes a body 12 having a plurality of panels 14, 16, 18 that are operative to transition between a closed position (shown in FIGS. 1 and 2) and an open position (shown in FIGS. 3-5). When in the closed position, the panels 14, 16, 18 define a cavity 20 (best seen in FIG. 2) that is configured to contain one or more animals/objects. In the open position, the panels 14, 16, 18 define a bed mat 22 (FIGS. 3-5). In other words, the body 12, via the plurality of panels 14, 16, 18, may be transitioned between a bag (the closed position shown in FIGS. 1 and 2) and a bed mat 22 (the open position shown in FIGS. 3-5). As used herein, the term "bed mat" means a device/apparatus that is generally flat and suitable for sitting and/or laying on, e.g., a blanket, sheet, tarp, etc.

As shown in FIG. 1, when the panels 14, 16, 18 are in the closed position, the body 12 may have a defined top 24, bottom 26, front 28, rear 30, first side 32, and second side 34, with: the top 24 disposed opposite the bottom 26 and adjacent to the first and second sides 32 and 34, as well as adjacent to the front 28 and rear 30; the bottom 26 disposed opposite the top 24 and adjacent to the first and second sides 32 and 34, as well as adjacent to the front 28 and rear 30; the front 28 disposed opposite the rear 30 and adjacent to the first and second sides 32 and 34, as well as adjacent to the top 24 and the bottom 26; the rear 30 disposed opposite the front 28 and adjacent to the first and second sides 32 and 34, as well as adjacent to the top 24 and the bottom 26; and with the first and second sides 32 and 34 opposite one another and adjacent to the top 24, the bottom 26, the front 28, and the rear 30. As will be appreciated, the term "sidewall", as used herein, refers to one or more of the panels 14, 16, 18 that form at least part of the front 28, rear 30, first side 32, and/or second side 34.

In certain aspects, the plurality of panels 14, 16, 18 includes two side panels 14 and 16 and/or a base panel 18, with side panel 14 attached to the side panel 16 such that side panel 14 defines the first side 32 of the body 12, side panel 16 defines the second side 34 of the body 12, side panels 14 and 16 both define the top 24, front 28, and/or rear 30 of the body 12, and with base panel 18 defining the bottom 26 of the body 12.

In certain aspects, the body 12 may be made of: natural materials, e.g., wool, cotton, leather, wood, etc.; artificial materials, e.g., plastics, polyesters, nylon, etc.; metals such as aluminum, copper, nickel, etc., and/or alloys thereof; composite materials, e.g., carbon fibers, aramid fibers, etc.; other suitable materials; and/or combinations thereof. For example, in embodiments, the body 12 may be made of a material that is resistant to liquids, e.g., water, and/or insulated to retain heat within the cavity 20, e.g., the panels 14, 16, 18 may be filled with goose down/feathers or other heat retaining materials to insulate the cavity 20 from winter conditions. When the panels 14, 16, 18 are in the closed position, the body 12 supports and/or retains any objects/pets placed into the cavity 20. In embodiments, the interior of the body 12, i.e., the surfaces of the panels 14, 16, 18 (best seen in FIG. 4) defining the cavity 20 may have a tufted or padded construction which may cushion an object/animal within the cavity 20 and/or provide suitable comfort when the apparatus 10 is functioning as a mat 22.

Figure 2:
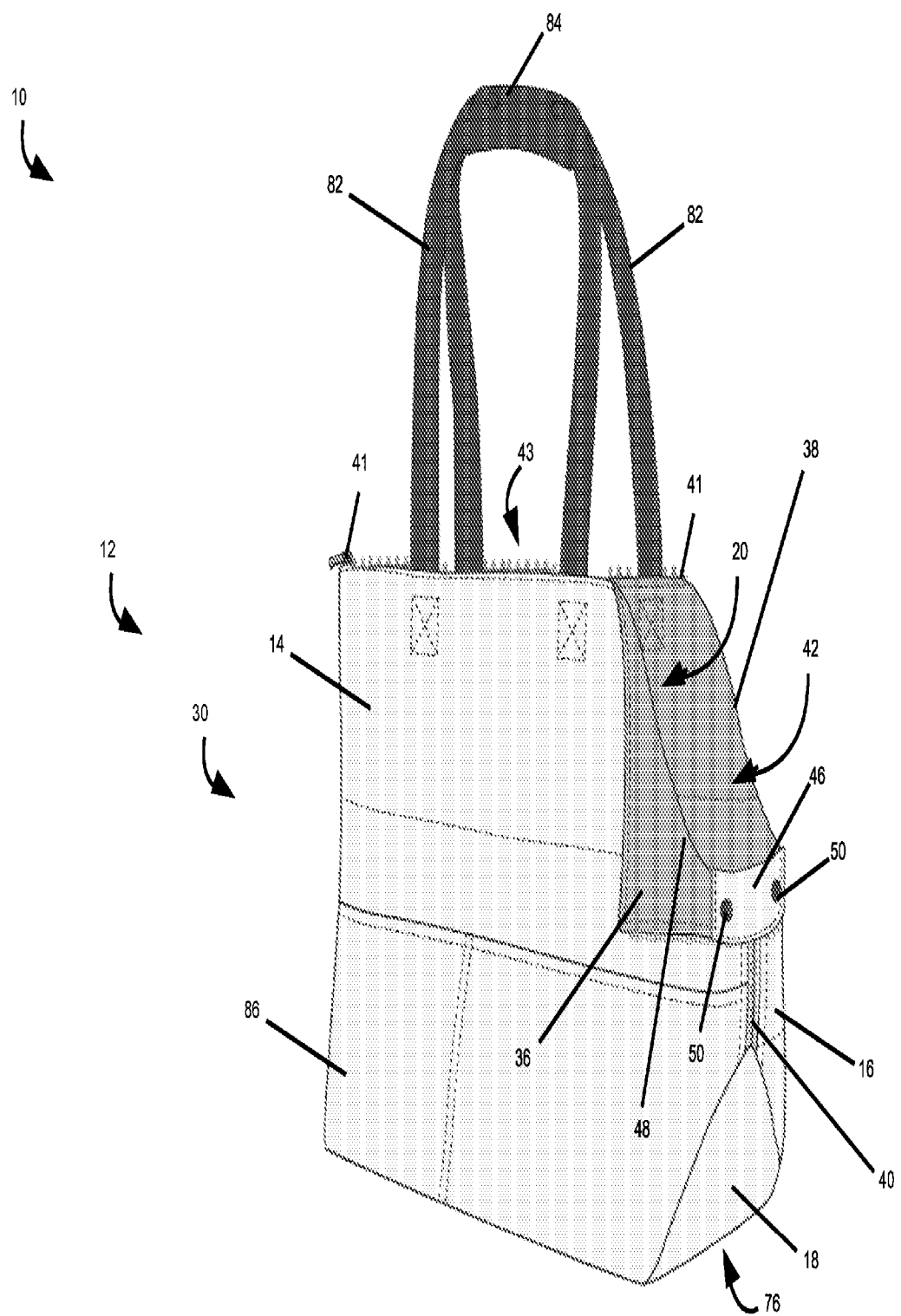
FIG. 2 is another diagram of the apparatus for transporting an animal of FIG. 1, wherein portions of sidewalls forming the body are detached from each other so as to form an opening into a cavity defined by the body in the closed position, in accordance with an embodiment of the present invention.

Referring now to FIGS. 1 and 2, in embodiments, side panels 14 and 16 may each have a portion, respectively numbered 36 and 38, that is selectively attachable to the portion 36 and 38 of the other side panel 14, 16 via a fastener 40 so as to define an opening 42 to the cavity 20 when the portions 36 and 38 are not attached to each other and the plurality of panels 14, 16, 18 are in the closed position. For example, as shown in FIG. 1, side panel 14 may include portion 36 that is selectively attachable to portion 38 on side panel 16. The opening 42 may be disposed in at least a part of a sidewall, e.g., the front 28, rear 30, first side 32, and/or second side 34. In certain aspects, the opening 42 may extend to the top 24 of the body 12, e.g., the opening 42 runs up the front 28 and along the top 24 of the body 12 as shown in FIG. 2. As will be appreciated, the opening 42 provides for quick access to the cavity 20 and/or may allow for the head and/or neck of a small animal, e.g., a dog or cat, to protrude from the cavity 20 while the animal is seated on, standing on, or otherwise supported by, the bottom panel 18 within the cavity 20. As will be understood, in embodiments where the opening 42 is partially, or completely, disposed within a sidewall, e.g., the front 28, of the body 12, the head of the animal may protrude from the cavity 20 without the animal having to stand-up, i.e., on hind legs.

As shown in FIGS. 1 and 2, the fastener 40 may be a zipper that extends from midway of the front 28 of the body 12 to the top 24 of the body 12, and in embodiments, may extend across the entire top 24. In some embodiments, the zipper 40 may extend from the front 28, across the top 24, and to the midpoint of the rear 30 of the body 12. In other embodiments, the fastener 40 may include two (2) zippers, one that runs along the front 28 of the body 12, with the other running along the rear 30 of the body 12. While the embodiments herein depict the fastener 40 as a zipper, it will be understood that the fastener 40 may also be a series of buttons, latches, hook and loop fasteners, and/or any other type of fastener suitable for selectively attaching the panels 14, 16, 18 as described herein. Further, in embodiments, the fastener 40 may not run along the top 24, such the panels 14 and 16 are not attached across the top 24 via fastener 40, so as to form a top-opening 43, which in embodiments, may be separate from the opening 42. In such embodiments, an additional fastener 41, e.g., a zipper, buttons, hook and loop fasteners, etc., may be disposed along the top 24 so as to close the top-opening 43. As will be appreciated, however, in some embodiments, the top-opening 43 may be joinable/mergeable to the opening 42. In embodiments, the top-opening 43 may be selectively closeable via fasteners 45 (best seen in FIG. 5), e.g., snap-buttons, hook and loop fasteners, zippers, securable straps, etc.

In embodiments, the shape of the opening 42 may be maintained by an additional set of fasteners 44 (best seen in FIGS. 1 and 4), e.g., snap-buttons, hook and loop fasteners, zippers, securable straps, etc., that retain the portions 36 and 38 to the sides 32 and 34 of the body 12 as shown in FIG. 2.

As further shown in FIG. 2, the apparatus 10 may also include a protective portion 46 configured to be disposed over an edge 48 of the opening 42 so as to restrict an animal's neck from directly contacting the edge 48 and/or the fastener 40, e.g., zipper. In embodiments, the protective portion 46 may be selectively secured to the body 12 via fasteners 50, e.g., snap buttons and/or hook and loop fasteners. The protective portion 46 may have one side/part/portion permanently attached/secured to the body 12, e.g., a part of the protective portion 46 may be stitched to a side panel 14 or 16.

Moving now to FIGS. 3-5, the bed mat 22 defined/formed by the body 12 when the panels 14, 16, 18 are in the open position is shown. In embodiments, each side panel 14 and 16 may include one or more folding lines 52, 54, 56, 58, 60, 62 that define one or more sub-sections 64, 66, 68, 70, 72, 74. For example, panel 14 may have sub-sections 64, 66, and 68 defined by folding lines 52, 54, and 56; and panel 16 may have subsections 70, 72, and 74 defined by folding lines 58, 60, and 62. The folding lines 52, 54, 56, 58, 60, 62 and subsections 64, 66, 68, 70, 72, 74 may provide the side panels 14 and/or 16 with a bent and/or curved shape when the plurality of panels 14, 16, 18 are in the closed position.

As illustrated in FIGS. 3-5, the base panel 18 may have one or more triangular portions 76 which may be defined by folding lines 78. As will be appreciated, in embodiments, the triangular portions 76 may be fastened to side walls 14 and 16 via fasteners 80 (best seen in FIG. 4), e.g., snap-buttons, hook and loop fasteners, zippers, securable straps, etc., when the panels 14, 16, and 18 are in the closed position, which in turn, forms the shape as best seen in FIGS. 1 and 2. In embodiments where the fastener 40 includes two (2) zippers, e.g., one running along the front 28 of the body 12 and one running along the rear 30 of the body 12, the zippers 40 may each run from the tip of the respected triangle portion 76 to the top 24 of the body 12. In such embodiments, the triangle portions 76 may restrict the opening 42 from encompassing the entirety of the sidewalls, i.e., the triangle portions 76 may prevent the body 12 from being "completely opened" such that a portion of the cavity 20 remains near the bottom 18 of the body 12.

In certain aspects, the bed mat 22 may be flexible as the folding lines 52, 54, 56, 58, 60, 62 may provide the plurality of panels 14, 16, 18 some degree of movement/give. In embodiments, the bed mat 22 may have a length L of about thirty-six (36) inches and a width W of about twenty (20) inches. As will be understood, however, the dimensions of the apparatus 10 may be varied according to suit a variety of applications.

Returning back to FIGS. 1 and 2, in embodiments, the apparatus 10 may further include one or more handles 82 disposed on the body 12, which may be operative to allow a pet owner to carry/transport the apparatus 10 and/or may facilitate storing and/or securing of the apparatus 10, i.e., the apparatus 10 may be hung on a hook and/or secured by running a strap through the open loop of the handles 82. While FIGS. 1-5 depict the handles 82 attached to the panels 14 and 16 near or at the top 24 of the body 12, it will be understood that the handles 82 may be attached to other locations of the body 12. As further shown in FIGS. 1 and 2, the handles 82 may include a fastener 84, e.g., snap-buttons, hook and loop fasteners, zippers, securable straps, etc., that secures the handles 82 together. As will be appreciated, fastener 84 may further provide protection to the shoulder, hand, arm, or other body part of a pet owner who may carry the apparatus 10 via the handles 82, e.g., the fastener 84 may be a padded strap.

In embodiments, the apparatus 10 may include one or more pockets 86 and/or connectors 88 (FIG. 3) disposed on and/or formed by the panels 14, 16, and/or 18, and in embodiments, may be disposed on the interior of the body 12, i.e., the surfaces of the panels 14, 16, 18 shows in FIG. 4 that form the cavity 20, and/or the exterior of the body 12, i.e., the surfaces of the panels 14, 16, 18 shown in FIG. 5 opposite the cavity 20. The pockets 86 may include fasteners (not shown) such as snap-buttons, hook and loop fasteners, zippers, securable straps, etc. The connectors 88 may include loops and/or rings operative to provide for the attachment of a leash, collar 90 (FIG. 3), or other object.

In operation, according to an embodiment, the apparatus 10 functions as a utility bag when the body 12/panels 14, 16, 18 are in the closed position and the portions 36 and 38 are attached to each other as shown in FIG. 1. The apparatus 10 may then be converted into a pet transporter by detaching the portions 36 and 38 as shown in FIG. 2. The apparatus 10 may then be transitioned to a bed mat 22 by placing the plurality of panels 14, 16, 18 in the open position as shown in FIGS. 3-5. Thus, some embodiments of the present invention may provide for a three-in-one pet carrier, e.g., utility bag, pet transporter/carrier, and bed mat.

For example, in an embodiment, a pet owner who needs to transport their slightly overweight welch corgi from their house to the beach may place the panels 14, 16, 18 in the closed position, detach the portions 36 and 38, secure the protective portion 46 over the edge 48, secure the triangular portions 76 in place via fatteners 80, place the corgi into the cavity 20 with the corgi's head protruding from the opening 42 and neck resting on the protective portion 46, and place sunscreen and/or a leash into the pockets 86. The pet owner may then fasten the handles 82 together via fastener 84, and subsequently carry the apparatus 10 with the corgi via the handles 82 to the beach.

At the beach, the pet owner may remove the corgi from the cavity 20, convert the apparatus 10 to a bed mat 22 by transitioning the panels 14, 16, 18 to the open position and unfastening the triangular portions 76 and protective portion 46. The pet owner and/or the corgi may then enjoy sitting and/or laying on the bed mat 22, as opposed to the hot sand.

After the day at the beach is over, the pet owner, believing that their slightly overweight corgi could benefit from some additional exercise, may then transition the panels 14, 16, 18 back to the closed position, and secure the triangular portions 76 in place via fasteners 80. The pet owner may then place some sea shells that they found at the beach within the cavity 20 via the opening 42, and or through a top opening 43, and then attach the portions 36 and 38 together such that the opening 42 is closed. The pet owner may then carry the apparatus 10 with the shells back to the house via handles 82, while the corgi burns some calories walking alongside the pet owner.

While the above example concerns using the present invention to transport a pet, it will be understood that embodiments of the invention are applicable to other scenarios. For example, the opening 42 may provide for a wine bottle, or other similar elongated object, to be stored within the cavity 20 with the neck of the bottle protruding from the opening 42. Similarly, embodiments of the invention may be used to store sporting equipment, such as a baseball bat, with the apparatus 10 also serving as a bench cushion for use in a dugout at a baseball field.

Accordingly, it is to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, an apparatus for transporting an animal is provided. The apparatus includes a body having a plurality of panels that are operative to transition between a closed position and an open position. In the closed position, the panels define a cavity that is configured to contain an animal. In the open position, the panels define a bed mat. In certain embodiments, the plurality of panels includes two side panels each having a portion that is selectively attachable to the portion of the other side panel via a fastener so as to define an opening to the cavity when the portions are not attached to each other and the plurality of panels are in the closed position. In such embodiments, the opening is disposed in at least part of a sidewall of the body. In certain embodiments, the opening extends to a top of the body. In certain embodiments, the top includes one or more handles. In certain embodiments, the fastener is a zipper. In certain embodiments, the plurality of panels includes a base panel having a triangular portion, and the zipper extends from the triangular portion to the top of the body. In certain embodiments, at least one of the side panels includes a protective portion that folds over an edge of the opening when the plurality of panels are in the closed position and the portions of the side panels are not attached. In certain embodiments, at least one of the side panels includes a pocket. In certain embodiments, the side panels have a shape that is at least one of bent and curved when the plurality of panels are in the closed position. In certain embodiments, the plurality of panels includes a base panel having one or more triangular portions.

Accordingly, by providing for an apparatus having a body with panels that transition between open and closed positions, some embodiments of the present invention provide for a multiple purpose apparatus, e.g., bag, tote, etc., that may be used as a utility bag, pet transporter/carrier, and/or bed mat. Thus, some embodiments of the present invention simplify the process of transporting an animal by removing the need to bring a separate mat for the animal to sit and/or sleep on in addition to the device used to transport the animal.

Further, by providing a single device/apparatus that serves as both a utility bag and as a pet transporter, some embodiments of the present invention have improved utility over traditional pet carriers, i.e., the present invention may be used in situations not concerning the transportation of an animal, e.g., shopping and/or attending a social event.

Further still, by providing for a pet transporter that is collapsible into a flat bed mat, some embodiments of the present invention provide for a pet-transporter that has improved storage, i.e., takes up less space when not in use, as compared to traditional pet-carriers.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

We claim:

1. An apparatus for transporting an animal comprising:
a body having a plurality of panels that are operative to transition between a closed position, where the panels form a cavity to contain an animal, and an open position, where the panels lie flat to form a bed mat;
the plurality of panels including two side panels and a base panel located between the side panels, the side and base panels forming opposing front and rear body portions, as well as a bottom body portion of the cavity;
first and second selectively mateable fasteners located on an exterior of each of the side panels, the first fastener being located in proximity to the cavity when the body is in the closed position and the second fastener being located in a position below that of the first fastener relative to a bottom of the apparatus;
a zipper extending along substantially an entirety of each side panel and a portion of the base panel at both the front and rear body portions, such that the side panels may be selectively joined together via closure of the two zippers to form the front, rear, and bottom body portions of the cavity such that the cavity is in its closed position for containment and transport of an animal, and the same two zippers may be selectively opened so that all panels lie flat and the body is in an open position thereby forming a bed mat; and
wherein in the closed position each zipper is located in a substantially central position on the front and rear body portions respectively; and
wherein at least one of the zippers may be partially unzipped to form an opening in a substantially central position on a front or rear body portion of the cavity through which an animal may extend its head;
wherein when the zipper is partially unzipped, portions of the side panels may be folded over, such that the first and second fasteners of each side panel may be mated to selectively fix each of the side panels in a position that defines a portion of the opening;
wherein at least one of the side panels further includes a protective portion, located on an interior of the side panel, that may be selectively folded over a portion of the zipper and fastened to prevent teeth of the zipper from contacting the head and/or neck of the animal when extended through the opening.

2. The apparatus of claim 1, wherein the top portion includes one or more handles.

3. The apparatus of claim 1, wherein the base panel has opposing triangular portions, and each zipper extends from one of the triangular portions along a side panel to the top portion of the body.

4. The apparatus of claim 1, wherein at least one of the side panels includes a pocket.

5. The apparatus of claim 1, wherein the side panels have a shape that is at least one of bent and curved when the plurality of panels are in the closed position.

6. The apparatus of claim 1, wherein the base panel has one or more triangular portions.

* * * * *